(12) United States Patent
Savale et al.

(10) Patent No.: US 7,255,084 B2
(45) Date of Patent: Aug. 14, 2007

(54) PISTON WITH A SKIRT HAVING A LOW COEFFICIENT OF FRICTION

(75) Inventors: Jérémy Savale, Limoges (FR); Marc Hervé, Limoges (FR); François Vérinaud, Limoges (FR)

(73) Assignee: Sorevi S.A., Limoges (FR)

(*) Notice: Subject to any disclaimer, the term of this patent is extended or adjusted under 35 U.S.C. 154(b) by 0 days.

(21) Appl. No.: 11/332,474

(22) Filed: Jan. 17, 2006
(Under 37 CFR 1.47)

(65) Prior Publication Data
US 2006/0236972 A1 Oct. 26, 2006

Related U.S. Application Data

(63) Continuation of application No. PCT/EP2004/050340, filed on Mar. 22, 2004.

(30) Foreign Application Priority Data
Jul. 17, 2003 (EP) .................. 03291770

(51) Int. Cl.
F02F 3/10 (2006.01)
(52) U.S. Cl. ................ 123/193.6; 29/888.048
(58) Field of Classification Search ............. 123/193, 123/6, 193.6; 92/223; 29/888.048
See application file for complete search history.

(56) References Cited

U.S. PATENT DOCUMENTS 121,990 A * 12/1871 Lemelson ................... 5/247
4,666,786 A 5/1987 Kato et al.
5,249,554 A 10/1993 Gangopadhyay et al.
5,909,879 A * 6/1999 Simpson .................... 277/399
2004/0074467 A1* 4/2004 Hamada et al. .......... 123/193.4
2004/0206600 A1* 10/2004 Takakura et al. ........ 192/107 M

FOREIGN PATENT DOCUMENTS

DE 19517541 A1 * 11/1996
DE 198 25 860 A1 12/1999
JP 2000-320670 11/2000
WO 97/14555 A1 4/1997

OTHER PUBLICATIONS

Patent Abstracts of Japan vol. 2000, No. 14, Mar. 5, 2001 & JP 2000 320670 A (Kayana Ind Co Ltd), Nov. 24, 2000.
International Search Report dated Aug. 30, 2004 in PCT application No. PCT/EP2004/050340, filed Mar. 22, 2004 (3 pages).
PCT Written Opinion of International Search Report dated Feb. 2, 2006, in PCT application No. PCT/EP2004/050340, filed Mar. 22, 2004 (5 pages).

* cited by examiner

Primary Examiner—Marguerite McMahon
(74) Attorney, Agent, or Firm—Shlesinger, Arkwright & Garvey LLP

(57) ABSTRACT

A piston for an internal combustion motor has a skirt with a surface, which is at least partially polished and thereafter coated with a coating having a hardness of greater than 8 GPa and having a coefficient of friction of less than 0.20. The piston has an increased performance, a longer lifetime and a reduced friction.

15 Claims, 1 Drawing Sheet

INVENTION

PISTON WITH A SKIRT HAVING A LOW COEFFICIENT OF FRICTION

CROSS-REFERENCE TO RELATED APPLICATIONS

This application is a continuation of application no. PCT/EP2004/050340, filed Mar. 22, 2004, which claims the priority of European application no. 03291770.0, filed Jul. 17, 2003, and each of which is incorporated herein by reference.

FIELD OF THE INVENTION

The present invention relates to a piston of an internal combustion motor, and more particularly to an improvement of the skirt surface of the piston. The invention also relates to a method of treating the skirt surface of the piston and to a use of the piston.

BACKGROUND OF THE INVENTION

On the one hand, pistons are widely known and used in internal combustion motors. The motors often operate with a frequency of several thousands rotations per minute at elevated temperatures. A lot of attention has been given to the working of those pistons, and more particularly to the reduction of friction of the piston inside the cylinder bore. Incremental reductions in friction or incremental improvements in lubrication may increase substantially the efficiency of the motor.

On the other hand, coatings such as diamond-like coatings are well known in the art, amongst others, for their hardness, for their corrosion resistance and for their low coefficient of friction. Diamond-like coatings have been applied successfully on various automotive components such as valve heads, rods, shafts, piston rings, and cylinder head.

Despite the widely spread use of pistons of internal combustion motors and despite the existence of hard coatings such as diamond-like coatings, application of hard coatings such as diamond-like coatings to the skirts of pistons has proved to be unsuccessful and not in line with other applications of diamond-like coatings.

OBJECTS AND SUMMARY OF THE INVENTION

It is an object of the invention to avoid the disadvantages of the prior art.

It is a further object of the invention to reduce the friction of a working piston of an internal combustion motor. It is another object of the invention to reduce the need for an additional lubricant.

It is still another object of the invention to increase the lifetime of a piston of an internal combustion motor. It is yet another object of the invention to increase the performance of a piston of an internal combustion motor.

According to a first aspect of the present invention, there is provided a piston with a skirt. The skirt has a surface, which is at least partially polished and thereafter coated with a coating having a hardness of greater than 8 GPa, the hardness being an indentation modulus as measured by a known indenter per ISO 14577-1, and having a coefficient of friction of less than 0.20 per ASTM G99, as set forth below.

The term hardness refers to a known metric (SI) hardness measurement for metallic materials; i.e., ISO 14577-1, as will be familiar to a person having ordinary skill in the art.

The term coefficient of friction refers to a friction coefficient as measured in a ball on disk test in dry circumstances. Reference is here made to ASTM G99 and to DIN 50 324. The friction test can be performed by means of a multi-axis tribometer such as type TE79 provided by Phoenix Tribology Ltd.

The part of the surface of the skirt is preferably polished until a surface with a flat surface morphology is obtained. The surface has at least partially a ten-point mean roughness Rz of less than 1.0. The ten-point mean roughness is determined as follows. A section of standard length is sampled from the mean line on the roughness chart. The distance between the peaks and valleys of the sampled line is measured in the y-direction. Then the average peak is obtained amongst the five tallest peaks and the average valley is obtained amongst the five lowest valleys. The sum of these two values is then made and is expressed in micrometer ($\mu$m).

The part of the surface of the skirt is preferably polished until a surface roughness Ra of less than 0.15 has been reached.

The term Ra refers to the arithmetical mean roughness and its value is expressed in micrometer ($\mu$m). Preferably Ra ranges from 0.08 to 0.15, most preferably from 0.08 to 0.12, e.g. from 0.08 to 0.10.

The working of the invention can be explained as follows.

A prior art piston skirt is provided with striations, ridges or small grooves. Generally the skirt surface has a ten-point mean roughness Rz about 7 to 8 and an arithmetical mean roughness Ra ranging from about 1 to about 5. The reason is that the skirt surface must retain the lubricating oil in order to allow for the sliding while reducing wear and friction. The relatively high surface roughness of the skirt functions as a reservoir for the lubricant.

So the skirt surface has an image of relatively high peaks and deep valleys. Coating the skirt with a hard coating such as a diamond-like carbon coating will not take away the existing roughness. Only the peaks will be covered with a hard coating that will make contact with any neighboring part. The surface area of the peaks is too small to make any effect.

The present invention departs from the generally accepted assumption that the skirt surface must be rough. The invention provides a polishing treatment prior to the coating so that the landscape of the skirt surface is flattened and that more working surface becomes available so that the effect of diamond-like carbon coatings is more pronounced.

The polishing treatment reduces the existing roughness and the reservoir available for the lubricant. However, this has not been considered as a disadvantage due to the self-lubricating properties of diamond-like coatings and due to a reduced need for extra lubrication.

JP-A-2000-320670 discloses a surface treatment method for a piston of a hydraulic pump or a hydraulic motor. To improve the sliding performance of the piston in a bore a surface hardening treatment is applied, thereafter the hardened layer is polished and the polished layer is coated with diamond-like carbon. The working circumstances of a hydraulic pump or hydraulic motor, however, are not that severe as in an internal combustion motor.

According to the invention, preferably the hard coating is selected from the group of diamond-like carbon coatings, diamond-like nanocomposite coatings, and wolfram carbide coatings including any doped such coatings or a combination thereof.

The terms "wolfram carbide" coatings refers to wolfram carbide coatings as such but also to wolfram carbide coatings, which have been enriched with carbon or to WC/C coatings with an additional layer of carbon in order to reduce the friction.

For example, the hard coating may have two layers, a first layer of a diamond-like coating (DLC) and a surface layer of a diamond-like nanocomposite coating (DLN), which has a coefficient of friction, which is even lower than the coefficient of friction of DLC.

DLC coatings (a-C:H) are a mixture of sp2 and sp3 bonded carbon atoms with a hydrogen concentration between 0-80%. DLN coatings (a-C:H/a-Si:O) are commercialized under the trademark DYLYN® and comprise C, H, Si and O:

a-Si:O enhances high temperature stability, leads to lower friction & lowers films stress a-C:H provides diamond-like properties.

An intermediate tie layer may be present between the polished skirt surface and the coating in order to increase the adhesion between the substrate of steel or aluminum and the hard coating.

In case there is an intermediate tie layer, the intermediate tie layer may be selected from a group consisting of diamond-like nanocomposite coatings, doped diamond-like coatings, TiN coatings, Ti (C,N) coatings, i-C coatings, wolfram carbide coatings, SiN coatings, CrN coatings or a combination hereof.

The hard coating on the polished skirt surface may have a thickness ranging from 1 micrometer to 10 micrometer, for example from 2 micrometer to 6 micrometer, e.g. about 4 µm.

According to a second aspect of the invention, there is provided a method of treating a piston, where the piston has a skirt.

The method comprises the following steps:

a) polishing at least partially the surface of the skirt;

b) coating the thus polished surface with a coating having a hardness of greater than 8 GPa and having a coefficient of friction of less than 0.20.

Preferably the coating is done under vacuum, e.g. by means of a chemical vapor deposition (CVD) process, most preferably by means of a plasma assisted chemical vapor deposition (PACVD) process or by means of a mixed PVD/PACVD process.

The invention piston according to the first aspect of the invention or treated according to the second aspect of the invention may be used in an internal combustion engine.

BRIEF DESCRIPTION OF THE DRAWINGS

The invention will now be described into more detail with reference to the accompanying drawings wherein.

DESCRIPTION OF A PRIOR ART EMBODIMENT

Figure 1:
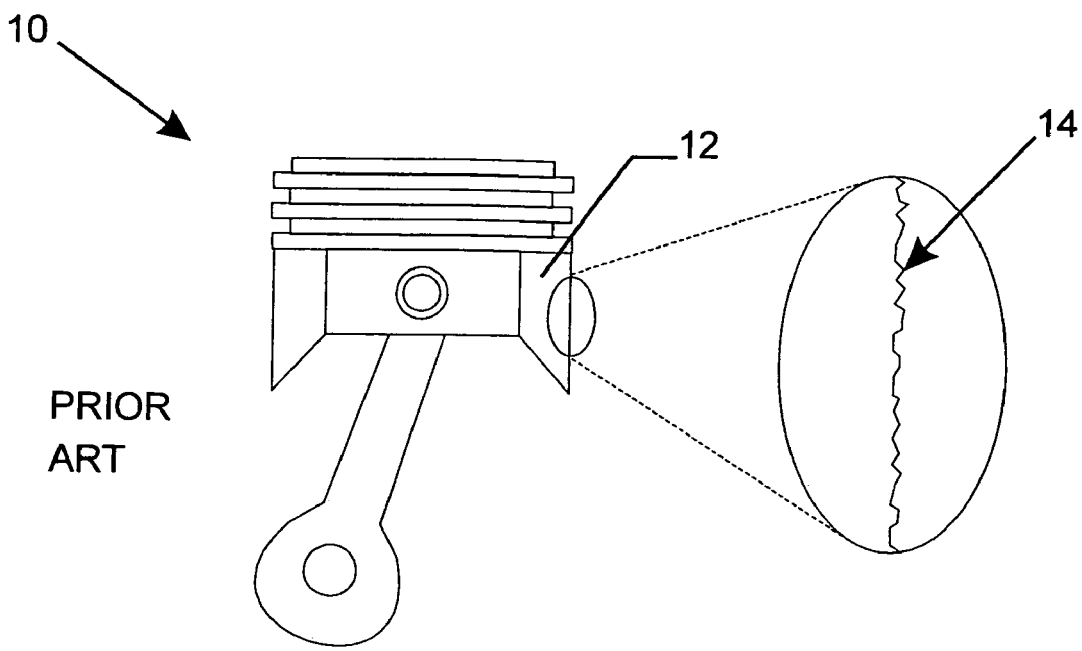
FIG. 1 shows a schematic drawing of a PRIOR ART embodiment of a piston.

FIG. 1 shows a PRIOR ART embodiment of a piston 10. The PRIOR ART piston 10 has a skirt 12. An enlarged view of its surface 14 is also shown. This enlarged view shows a surface with roughnesses Ra ranging from 3 to 5 and even higher. The valleys between the peaks serve as reservoir for the lubricant and facilitate the mounting of the lubricant upwards. The coating of this PRIOR ART piston skirt with a hard coating does not lead to any substantial advantages. The reason is that any contact with e.g. the cylindrical bore is limited to the surfaces of the peaks, which are too small.

DETAILED DESCRIPTION OF THE INVENTION

Embodiment 1

Figure 2:
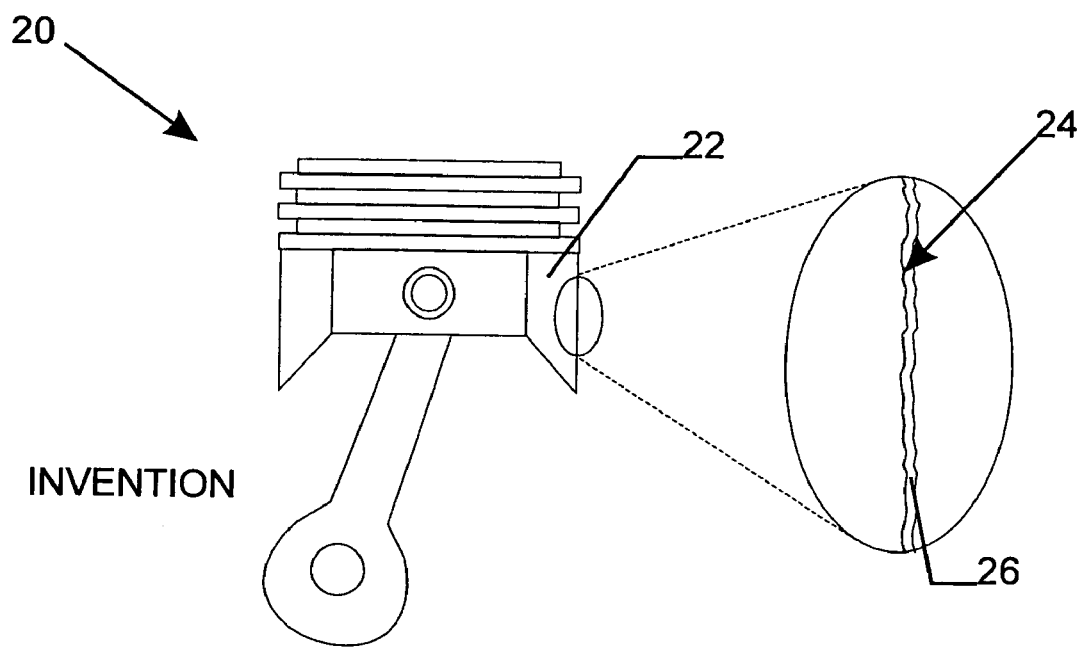
FIG. 2 shows a schematic drawing of a piston according to the first aspect of the invention.

FIG. 2 shows an embodiment of a piston 20 according to the invention. The piston 20 has a skirt 22 which may be out of steel or out of aluminum or out of titanium. The skirt 22 has been subjected to a polishing treatment preferably until its surface 24 obtains a roughness Ra of below 0.10. Thereafter a PACVD process deposits a hard diamond-like carbon coating with a thickness ranging between 1 µm and 6 µm, a harness greater than 10 GPa and a coefficient of friction lower than 0.20.

The PACVD process mainly occurs as follows.

The pistons 20 with the polished skirt surfaces 24 are placed in a vacuum chamber.

A liquid organic precursor containing the elements C and H in suitable proportions is introduced in the vacuum chamber. A plasma is formed from the introduced precursor by an electron assisted DC-discharge using a filament with a filament current of 50-150 A, a negative filament bias DC voltage of 50-300 V and with a plasma current between 0.1 and 20 A and a composition is deposited on the piston skirt, to which a negative DC-bias or negative RF self-bias voltage of 200 to 1200 V is applied, in order to attract ions formed in the plasma.

The plasma generation and the vacuum deposition may be performed in one single chamber. The pistons 20 may be arranged on a rotatable support (in the upper part of the vacuum chamber) in a manner similar to that shown in U.S. Pat. No. 5,352,493. The base pressure in the vacuum chamber is $3 \times 10^{-7}$ mbar and the typical working pressure is maintained at $1 \times 10^{-4}$ to $1 \times 10^{-3}$ mbar by diffusions pumps (controlled with throttle valves).

The piston skirts 22 can be cleaned by an in-situ (Ar-) plasma etching process prior to deposition. This plasma etching may last for 3 to 30 minutes. The piston skirt temperature does generally not exceed 200° C. during the deposition process.

A liquid precursor is preferably preheated above 30° C. before or during release in the vacuum chamber. The precursor is delivered to the vacuum chamber e.g. through a heat resistant porous body with a porosity of e.g. 30 to 50%. The precursor can continuously be metered in small quantities through a tube, which delivers it as a vapor or a mist to the porous body. Otherwise the precursor can be introduced in batch in an open reservoir, which is placed in the chamber before this is put to vacuum. This reservoir can be electrically heated prior to the start of the deposition process inside the chamber to form the vapor.

A bundle of alloyed Tungsten filaments is placed as a cathode typically at about −150 V (DC bias voltage) in front of the earthed porous body. The body itself, with the inlet tube for the precursor at the backside of the porous body may be mounted in the lower part of the chamber. The filament bundle is convexly bent, e.g. to a half circle in a vertical plane and with a length of 15 to 30 cm. The current in the cathode filaments is preferably between 50 and 120 A (AC). The plasma current (measured between filament bundle and earthed porous body) can then typically amount to about 0.5 to 3 A. Preheating the precursor may offer the advantage that the current needed afterwards in the cathode filaments (for generating the plasma) could be lowered.

The distance between the uppermost area of the bent cathode bundle and the piston skirt is at least about 20 cm. The deposition occurs from bottom to top through attraction of the plasma ions by the substrate support, which is put to a negative RF self-bias voltage of typically about 400 V. Also the RF frequency is preferably much lower than that used according to U.S. Pat. No. 5,352,493; viz. between 100 and 500 kHz and specifically about 200 to 300 kHz.

Invention pistons for motors with two stroke cycles have shown an improved behavior with respect to existing prior art pistons. This improved behavior resulted from an increased lifetime or from an increased performance.

Embodiment 2

The following double coating has been deposited on a polished piston skirt 22:
  First a diamond-like carbon (DLC) coating of 3 μm;
  Thereafter, a diamond-like nanocomposite (DLN) coating of 1 μm in order to profit from the usually lower coefficient of friction of DLN (e.g. less than 0.10 for DLN instead of less than 0.20 for DLC). Although lower than the hardness of DLC, the DLN topcoat still has a hardness higher than 10 GPa.

Embodiment 3

First some tie layers have been deposited on a polished piston skirt, and thereafter an i-C coating has been deposited:
  a TiN layer;
  a Ti (C,N) layer;
  an i-C coating
The coating has a hardness of more than 30 GPa and the coefficient of friction is less than 0.10.

Embodiment 4

First a tie layer of a silicon-nitrogen doped diamond-like carbon coating is deposited on a polished piston skirt. This coating has a good adhesion to the substrate. Thereafter a DLC top layer is deposited.

Embodiment 5

First a tie layer of DLN is deposited as tie layer on the polished piston skirt. Thereafter a DLC top coating is deposited.

Embodiment 6

The initial rough surface of the piston skirt had following roughness parameters:
  Ra=0.79 μm
  Rz=6.32 μm
After polishing the piston skirt had a smooth planar surface with following roughness parameters:
  Ra=0.02 μm
  Rz=0.21 μm
The polished piston skirt has thereafter been covered with a DLC coating.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A piston for an internal combustion motor, comprising:
  a) a skirt having a surface;
  b) the surface being at least partially polished and thereafter coated with a coating, the coating having a hardness of greater than 8 GPa, the hardness being an indentation modulus as measured by an indenter, and having a coefficient of friction of less than 0.20, the coefficient of friction being as measured in a ball on disk test according to ASTM G99;
  c) the surface of the skirt having a flat surface morphology and having at least partially a ten-point mean roughness Rz of less than 1.0;
  d) the surface of the skirt having at least partially an arithmetical mean roughness Ra of less than 0.15;
  e) the coating being selected from the group consisting of diamond-like carbon coatings, diamond-like nanocomposite coatings, wolfram carbide coatings, and a combination thereof;
  f) an intermediate tie layer being present between the polished surface and the coating; and
  g) the intermediate tie layer being selected from a group consisting of diamond-like nanocomposite coatings, doped diamond-like coatings, doped diamond-like nanocomposite coatings, TiN coatings, Ti (C,N) coatings, SiN coatings, CrN coatings, wolfram carbide coatings, and a combination thereof.

2. A piston according to claim 1, wherein:
  a) the coating has a thickness ranging from 1 micrometer to 10 micrometer.

3. Use of a piston according to claim 1, in an internal combustion motor.

4. A piston according to claim 1, wherein:
  a) the coating has a thickness ranging from 1 micrometer to 10 micrometer.

5. A method of treating a piston of an internal combustion motor, the piston having a skirt, the method comprising the following steps:
  a) polishing at least partially the surface of said skirt;
  b) coating the at least partially polished surface with a coating having a hardness of greater than 8 GPa, the hardness being an indentation modulus as measured by an indenter, and having a coefficient of friction of less than 0.20, and the coefficient of friction being as measured in a ball on disk test according to ASTM G99;
  c) providing an intermediate tie layer between the polished surface and the coating; and
  d) selecting the intermediate tie layer from a group consisting essentially of diamond-like nanocomposite coatings, doped diamond-like coatings, doped diamond-like nanocomposite coatings, TiN coatings, Ti (C,N) coatings, SiN coatings, CrN coatings, wolfram carbide coatings, and a combination thereof.

6. A method according to claim 5, wherein:
  a) the coating is done in vacuum.

7. A method according to claim 5, wherein:
  a) the coating is done by use of one of a CVD process, a PVD process, a PACVD process, and a mixed PVD/PACVD process.

8. A method according to claim 5, wherein:
a) the surface of the skirt has at least partially an arithmetical mean roughness Ra of less than 0.15.

9. A method according to claim 5, wherein:
a) the coating is selected from the group consisting essentially of diamond-like carbon coatings,
b) diamond-like nanocomposite coatings, wolfram carbide coatings, and a combination thereof.

10. A piston for an internal combustion motor, comprising:
a) a skirt having a surface;
b) the surface being at least partially polished and thereafter coated with a coating, the coating having a hardness of greater than 8 GPa, the hardness being an indentation modulus as measured by an indenter, and having a coefficient of friction of less than 0.20, the coefficient of friction being as measured in a ball on disk test according to ASTM G99;
c) an intermediate tie layer being present between the polished surface and the coating; and
d) the intermediate tie layer being selected from a group consisting essentially of diamond-like nanocomposite coatings, doped diamond-like coatings, doped diamond-like nanocomposite coatings, TiN coatings, Ti (C,N) coatings, SiN coatings, CrN coatings, wolfram carbide coatings, and a combination thereof.

11. A piston according to claim 10, wherein:
a) the surface of the skirt having a flat surface morphology and having at least partially a ten-point mean roughness Rz of less than 1.0.

12. A piston according to claim 10, wherein:
a) the coating has a thickness ranging from 1 micrometer to 10 micrometer.

13. A piston according to claim 10, wherein:
a) the surface of the skirt has a surface, the surface having at least partially an arithmetical mean roughness Ra of less than 0.15.

14. Use of a piston according to claim 12, in an internal combustion motor.

15. Use of a piston according to claim 10, in an internal combustion motor.

* * * * *